United States Patent
Pessl

(10) Patent No.: US 12,273,454 B2
(45) Date of Patent: Apr. 8, 2025

(54) COMPRESSION IN LATTICE-BASED CRYPTOGRAPHY

(71) Applicant: Infineon Technologies AG, Munich (DE)

(72) Inventor: Peter Pessl, Munich (DE)

(73) Assignee: Infineon Technologies AG, Neubiberg (DE)

(*) Notice: Subject to any disclaimer, the term of this patent is extended or adjusted under 35 U.S.C. 154(b) by 50 days.

(21) Appl. No.: 17/700,082

(22) Filed: Mar. 21, 2022

(65) Prior Publication Data
US 2022/0303133 A1 Sep. 22, 2022

(30) Foreign Application Priority Data
Mar. 19, 2021 (DE) .................. 102021106883.5

(51) Int. Cl.
| | |
|---|---|
| H04L 29/06 | (2006.01) |
| G06F 7/499 | (2006.01) |
| H03M 7/30 | (2006.01) |
| H04L 9/30 | (2006.01) |
| H04L 9/32 | (2006.01) |

(52) U.S. Cl.
CPC ........ H04L 9/3093 (2013.01); G06F 7/49947 (2013.01); H03M 7/6041 (2013.01); H04L 9/3234 (2013.01)

(58) Field of Classification Search
CPC . H04L 9/3093; H04L 9/3234; G06F 7/49947; H03M 7/6041

USPC .......................................................... 380/28
See application file for complete search history.

(56) References Cited

U.S. PATENT DOCUMENTS

| | | | | |
|---|---|---|---|---|
| 5,838,791 | A * | 11/1998 | Torii | H04N 7/1675 |
| | | | | 348/E7.056 |
| 8,108,682 | B2 * | 1/2012 | Watanabe | H04L 9/0643 |
| | | | | 713/168 |
| 9,698,986 | B1 * | 7/2017 | Gutoski | H04L 9/3093 |
| 10,103,886 | B1 | 10/2018 | Gutoski et al. | |
| 11,308,873 | B2 * | 4/2022 | Mobasher | G09G 3/3208 |
| 2017/0244967 | A1 * | 8/2017 | Wang | H04N 19/91 |
| 2020/0344084 | A1 * | 10/2020 | Shribman | H04L 69/168 |
| 2021/0175899 | A1 * | 6/2021 | Rupp | G06F 7/49947 |
| 2022/0092365 | A1 * | 3/2022 | Yueksel | G06N 3/045 |

OTHER PUBLICATIONS

Dijk, "Fully Homomorphic Encryption over the Integers", 2010, EUROCRYPT, pp. 1-28 (Year: 2010).*
Bos, "CRYSTALS-Kyper: a CCA-secure module-lattice-based KEM", 2018, IEEE, pp. 1-14 (Year: 2018).*
R. Avanzi, et al., "CRYSTALS-Kyber", Algorithm Specifications And Supporting Documentation, 43 pgs., Jan. 31, 2021.
(Continued)

*Primary Examiner* — Taghi T Arani
*Assistant Examiner* — Gregory A Lane
(74) *Attorney, Agent, or Firm* — Banner & Witcoff Ltd.

(57) ABSTRACT

Compiling a compression function of a lattice-based cryptographic mechanism by (i) basing the compression function on a lossy compression function, (ii) determining an error based on a loss introduced by an integer division, and (iii) determining an output of the compression function based on the error.

9 Claims, 4 Drawing Sheets

(56) References Cited

OTHER PUBLICATIONS

L. Goubin, "A Sound Method for Switching between Boolean and Arithmetic Masking", C.K. Koc, D. Naccache, and C. Paar (Eds.): CHES 2001, LNCS 2162, pp. 3-15, Springer-Verlag Berlin Heidelberg 2001.
P. Ravi, et al., "Lattice-Based Key Sharing Schemes: A Survey", 39 pgs., A Survey; vol. 1, No. 1, Article, Oct. 2020.
Jan. 17, 2022—(DE) German Patent Office, Office Action issued for DE 102021106883.5, 12 pgs.
J. Coron, et al., "Conversion from Arithmetic to Boolean Masking with Logarithmic Complexity, International Association for Cryptologic Research", 20 pgs., 2015.

* cited by examiner

COMPRESSION IN LATTICE-BASED CRYPTOGRAPHY

BACKGROUND

Post-Quantum Cryptography is of growing importance, as demonstrated by ongoing standardization efforts of NIST, see [ABD+21].

An introduction to lattice-based key sharing schemes is described in [RHCB20]. Kyber and NewHope are lattice-based key-encapsulation mechanisms (KEMs). The following description picks Kyber as an exemplary embodiment. However, the examples described herein may be applied for NewHope or any lattice-based scheme requiring comparison in conjunction with similar compression techniques.

SUMMARY

An objective is to improve existing solutions and in particular to hinder or avoid successful attacks against a cryptographic system or entity.

This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

A method is provided for compiling a compression function of a lattice-based cryptographic mechanism,
- wherein the compression function is based on a lossy compression function;
- wherein an error is determined based on a loss introduced by an integer division;
- wherein an output of the compression function is determined based on the error.

The error may be regarded as a compression error or a rounding error.

Hence, the compression function can be determined without having to compute an integer division.

The compression function can also be regarded as a derived compression function that is based on the lossy compression function.

Compiling the compression function may comprise any generation, construction, creation or utilization of a compression function.

The compiled compression function may be a portion of a compression mechanism utilized with the lattice-based cryptographic mechanism.

According to an embodiment the output of the compression function is compared with a ciphertext or with an information that is based on the ciphertext.

According to an embodiment the compression function is determined based on a rounding down conversion $$\text{Compress}_q(x, d) = \lceil (2^d/q) \cdot x \rfloor \bmod 2^d$$
$$= \lfloor (x \cdot 2^d + q/2)/q \rfloor \bmod 2^d,$$

with
- d being the compression parameter,
- q being a prime number,
- x being an information that is subject to the compression,
- $\lceil \cdot \rfloor$ being a rounding operation,
- $\lfloor \cdot \rfloor$ being a rounding down operation to the next smallest integer, and
- mod $2^d$ meaning reducing the result to the range [0, $2^d-1$].

According to an embodiment the term $$(x \cdot 2^d + q/2) \bmod q$$

is the error.

According to an embodiment the input of the compression function is split into at least two shares.

According to an embodiment the comparison function is determined after an arithmetic-to-Boolean conversion According to an embodiment the compression function is at least partly conducted on one of the following:
- a security device,
- a secured cloud,
- a secured service,
- an integrated circuit,
- a hardware security module,
- a trusted platform module,
- a crypto unit,
- a FPGA,
- a processing unit,
- a controller,
- a smartcard.

Also, a security device is provided that is arranged to compile a compression function by executing the steps:
- determining an error based on a loss introduced by an integer division pursuant to a lossy compression function;
- determining an output of the compression function based on the error.

According to an embodiment the security device is one of the following or comprises at least one of the following:
- a secured cloud,
- a secured service,
- an integrated circuit,
- a hardware security module,
- a trusted platform module,
- a crypto unit,
- a FPGA,
- a processing unit,
- a controller,
- a smartcard.

Furthermore, a computer program product is suggested, which is directly loadable into a memory of a digital processing device, comprising software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
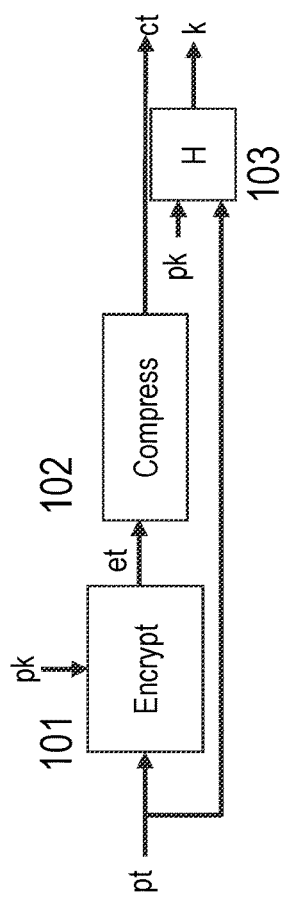
FIG. 1 shows a block diagram visualizing steps of a simplified encapsulation conducted at a sending entity utilizing Kyber.

FIG. 1 shows a block diagram visualizing steps of a simplified encapsulation: A plaintext pt is fed to an encryption unit 101, which uses a public key pk to compile an encrypted text et, which is then compressed by a compression unit 102 into a ciphertext ct. Also, the plaintext pt is fed to a hash function 103, which compiles a hash value k based on the plaintext pt and the public key pk. The result of the encapsulation are the ciphertext ct and the hash value k. The hash value k may be used as a shared secret of the sender shown in FIG. 1 and a receiver as depicted in FIG. 2.

Figure 2:
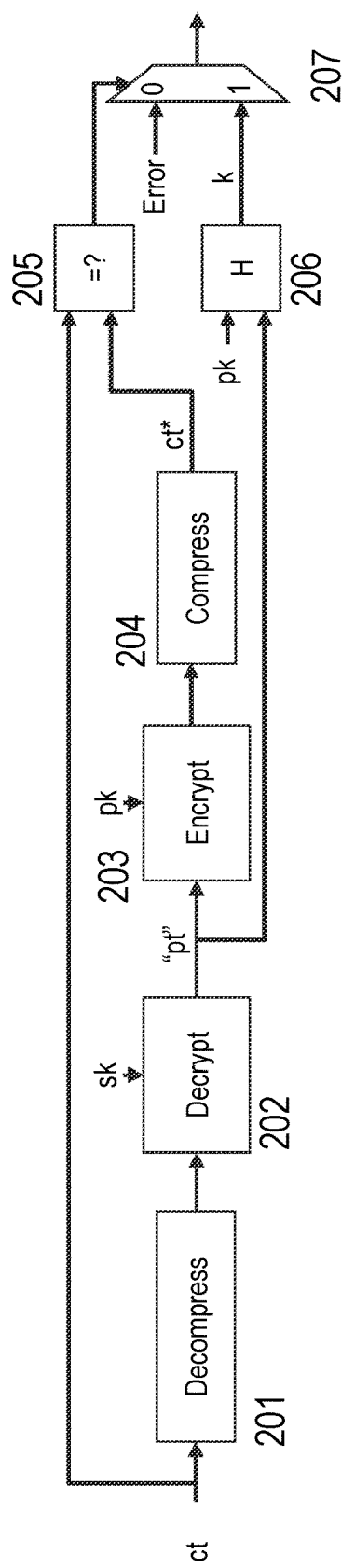
FIG. 2 shows a block diagram visualizing steps of a simplified decapsulation conducted at a receiving entity utilizing Kyber.

FIG. 2 shows a block diagram visualizing steps of a simplified decapsulation: The receiving entity obtains the ciphertext ct. The receiving entity has a secret key sk that corresponds to the public key pk. It is noted that sender and receiver utilize public-key cryptography, wherein each receiver has a key pair comprising a public key and a private key. The public key can be used to encrypt messages that can only be decrypted by the receiver with its private key. The private key is considered a secret that shall not be shared.

A protection against chosen ciphertext attacks is achieved by conducting a re-encryption and a comparison at the receiver.

In FIG. 2, the ciphertext ct is fed to a decompression unit 201. The output of the decompression unit 201 is connected to a decryption unit 202. The decryption unit 202 uses the secret key sk to determine the plaintext pt.

The plaintext pt is then encrypted by an encryption unit 203 using the public key pk. The output of the encryption unit 203 is connected to a compression unit 204, which compiles a ciphertext ct* based on the plaintext pt.

Also, the plaintext pt is fed to a hash function 203, which compiles the hash value k based on the plaintext pt and the public key pk.

A comparing unit 205 compares the ciphertext ct* with the ciphertext ct from the sender. If both ciphertexts ct and ct* are identical, a multiplexer 207 is switched to connect to the output of the hash function 203, which allows conveying the hash value k as an output value. Otherwise, the multiplexer 207 is switched to another input, which conveys a value indicating an error as the output.

Hence, during decapsulation, Kyber re-encrypts a decrypted message. The outcome of this re-encryption is then compared to the received ciphertext. If they match, only then the hash value k is released. This re-encryption and the final comparison need to be protected against side-channel attacks.

Hence, the hash value k can be generated at the sender shown in FIG. 1 as well as at the receiver of FIG. 2 and could be used as a shared secret, e.g., a key for further encryption purposes.

It is noted that compression and decompression may be specified as internal components of the encryption unit 101 and of the decryption unit 203, respectively. Here, to highlight this functionality, compression and decompression are put into dedicated units (compression unit 102 and decompression unit 201).

Hereinafter, an approach will be described that enables an efficient solution to in particular protect the operations conducted by the compression unit 204.

A large part of the re-encryption can be protected using arithmetic masking over $Z_q$, i.e., a sensitive value v is split into values v', v'' such that $$v=(v'+v'') \bmod q, \quad (1)$$

then the values v', v'' are processed independently. The values v', v'' are also referred to as shares of v. For Kyber, the modulus q=3329 may be used in parameter sets.

In the last step of the re-encryption, intermediate values c* (arithmetically shared) are compressed and then packed into bytes. The outcome (in FIG. 2 referred to as ct*) is compared with a received ciphertext c (in FIG. 2 referred to as ct).

A protected computation of packing might be avoided by instead unpacking the received ciphertext c and then comparing the unpacked version, since $$\text{Unpack}(\text{Pack}(x))=x. \quad (2)$$

However, this does not work in combination with a lossy compression:

$$\text{Decompress}(\text{Compress}(x)) \neq x \quad (3)$$

Computing the compression in a masked manner is difficult and will likely need several costly masking conversions (between masking arithmetically mod q, arithmetically mod $2^d$, and boolean). Thus, such an approach may easily get inefficient.

Compression and Decompression

In the Kyber specification [ABD+21], compression and decompression are determined as follows:

$$\text{Compress}_q(x,d)=\lceil (2^d/q) \cdot x \rfloor \bmod 2^d \quad (4)$$

$$\text{Decompress}_q(x,d)=\lceil (q/2^d) \cdot x \rfloor \quad (5)$$

with d being the compression parameter, $\lceil \cdot \rfloor$ being a rounding operation (rounding to the nearest integer), and mod $2^d$ means reducing the result to the range $[0, 2^d-1]$.

For performance reasons, floating-point arithmetic is usually avoided. Hence, the above may beneficially be computed using integer operations. However, most processors do not directly support rounding to the nearest integer after an integer division, but instead round to the next lower integer (also referred to as rounding down):

$$c=\lfloor a/b \rfloor.$$

For the above reason, a rounding to the nearest (upper or lower) integer can be done by first adding a value of 0.5 and then rounding down, i.e.

$$\lceil x \rfloor = \lfloor x+0.5 \rfloor.$$

Since floating-point arithmetic is avoided and rounding occurs after a division, the following may be used:

$$\lceil a/b \rfloor = \lfloor a/b+\frac{1}{2} \rfloor = \lfloor (a+b/2)/b \rfloor. \quad (6)$$

The last variant can be computed using only integer operations. Applying this on the definition of the compression according to Equation (4) results in:

$$\text{Compress}_q(x,d)=\lfloor (x \cdot 2^d+q/2)/q \rfloor \bmod 2^d. \quad (7)$$

Compression also requires a reduction modulo $2^d$, which may be achieved by selecting only the d lowest bits of any number and setting all upper bits to 0. This can be achieved using a bitwise AND operation with a bit mask. Multiplications with $2^d$ can be done applying a bitwise shift left by d bits.

The Kyber C reference implementation thus realizes compression and decompression as follows:

$$\text{compressed}=((x<<d)+Q/2)/Q\&((1<<d)-1)$$

$$\text{decompressed}=((x*Q)+(1<<(d-1)))>>d$$

Compression involves an integer division by the constant q. Division instructions can be expensive in terms of runtime, especially on low-cost devices. Also, the runtime can depend on the values of the input operands; such runtime dependencies are preferably avoided in a secured implementation. Hence, compilers may replace a division by constant with a multiplication of the reciprocal. An example shows the following assembler listing for the compression core (using d=4):

|  |  |
| --- | --- |
| ADD   | r0, r1, r0, LSL #4 |
| MOVW  | r1, #0x7681 |
| MOVT  | r1, #0x3afb |
| UMULL | r1, r3, r0, r1 |
| SUBS  | r0, r0, r3 |
| ADD   | r0, r3, r0, LSR #1 |
| UBFX  | r0, r0, #11, #4 |

For clarification reasons, a corresponding disassembly is shown hereinafter. It involves additions, a multiplication with the reciprocal of q, and several bit-wise operations (shifts, extraction):

x=x<<4; x=x+0x680; //q/2=0x680
int64_t t=x*0x3afb7681ul;//mult. with a
    reciprocal of q (x*round(2^44/q))
t=t>>32; //only use upper 32 bits of the product
x=x−t;
x=x>>1;
x=x+t;
x=x>>11;
x=x & 0xf;

Difficulties with Masking the Compression

For achieving side-channel protection, the compression is to be computed in a masked manner, i.e., operations are conducted on a shared representation of the involved variables and the shares are processed independently. Doing this directly is difficult because of the multitude of different operations.

There exist two variants of masking/sharing, namely Boolean and arithmetic masking. The more beneficial variant may depend on the computed operation. In the following description of the masking variants, parentheses are used to highlight that computations on the two shares are done independently. Also, the shares are beneficially not combined (unmasked) as long as the shared value is security relevant. The combination of the shares in the following examples is to merely demonstrate the equality of shared and non-shared operations.

Boolean Masking

The shares x and x are combined using a boolean XOR operation "⊕":

$$x=x'\oplus x''\tag{8}$$

This representation allows easy bit shifting, as $$x<<d=(x'<<d)\oplus(x''<<d),\tag{9}$$

and easy extraction of bits and thus reductions mod $2^d$, as $$x \bmod 2^d=(x' \bmod 2^d)\oplus(x'' \bmod 2^d)\tag{10}$$

It also allows easy XOR-combining of two shared values, as $$x\oplus y=(x'\oplus y')\oplus(x''\oplus y'').\tag{11}$$

Arithmetic Masking

The shares x and x are combined using an addition $$x=(x'+x'')\bmod n.\tag{12}$$

In the following examples, the equations are conducted mod n. Arithmetic masking allows easy addition of masked values, i.e., $$x\oplus y=(x'+y')+(x''+y'')\tag{13}$$

and multiplication with a constant, i.e., $$x\cdot c=(x'\cdot c)+(x'\cdot c).\tag{14}$$

A protected Kyber implementation might use two different moduli: n=q or n=$2^d$.

There are algorithms that allow conversion between these representations. Such algorithms are known as Boolean-to-arithmetic (B2A) and arithmetic-to-Boolean (A2B) conversions (see, e.g., [Gou01, CGTV15]) and may assume that n=$2^d$, e.g., $2^{32}$. Switching between different moduli for arithmetic sharing purposes also requires conversions.

The above exemplary uses two shares x and x, but values may accordingly be split into more than two shares.

Encryption involves computations on values which are reduced mod q (with q being a prime number). Hence, in a protected implementation, the output of the encryption, which may serve as an input of the compression, is likely shared arithmetically mod q. The first three lines of the disassembly above are the easiest to compute when masked arithmetically mod $2^{64}$. The subsequent shift may be processed using Boolean masking. This is followed by several shifts and additions/subtractions, which again need different representations. Hence, multiple expensive masking conversions are needed for computing a single call of the compression function.

Efficient Solution

Examples described herein allow performing protected comparison in an efficient manner, which reduces the cost down to a single masking conversion, thus improving the performance.

Figure 3:
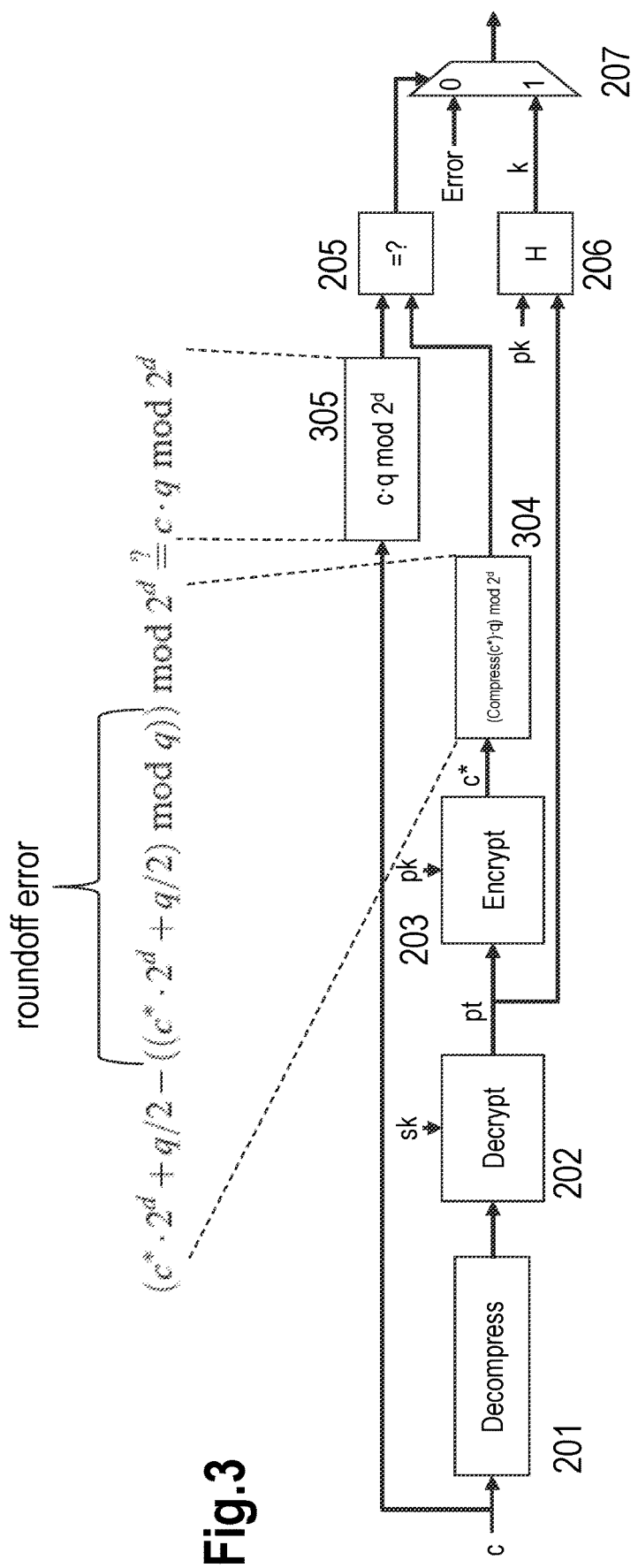
FIG. 3 shows a block diagram visualizing steps of an improved decapsulation utilizing a compression based on a roundoff error.

FIG. 3 shows a block diagram based on FIG. 2 comprising steps to be conducted at the receiver. The ciphertext c is fed to the decompression unit 201 and to a multiplication unit 305. The multiplication unit 305 conducts the operation $$c\cdot q \bmod 2^d$$

and its output is conveyed to the comparing unit 205.

The encryption unit 203 encrypts the plaintext pt into an intermediate ciphertext c*, which is forwarded to a compression unit 304. The output of the compression unit 304 is supplied to the comparing unit. The compression unit 304 will be described in more detail below.

The compression function involves an integer division by q. Instead of directly computing this division on the masked data, an error (also referred to as roundoff error of compression error) introduced by the division is computed and then this error is subtracted from the dividend. In other words, this allows obtaining $$\lfloor (x\cdot 2^d+q/2)/q \rfloor \cdot q$$

without actually having to compute the division. The output can then be compared to the output of the function c·q.

Hence, a different way of evaluating $$\text{Compress}(c^*) \stackrel{?}{=} c \qquad (15)$$

is suggested, with $\stackrel{?}{=}$ denoting an equality test.

Inserting the definition of compression using the rounding conversion (Equation (7)) results in:

$$\text{Compress}_q(c^*) = \lfloor (c^* \cdot 2^d + q/2)/q \rfloor \bmod 2^d \stackrel{?}{=} c \bmod 2^d \qquad (16)$$

The modulo operator is defined to return the remainder after an integer division with the modulus q. Per this definition, each number x can be written as the sum of a multiple X of the modulus q and the remainder x mod q, i.e.

$$x = X \cdot q + (x \bmod q), \qquad (17)$$

with $X = \lfloor x/q \rfloor$. When setting $x = c^* \cdot 2^d + q/2$, the following applies:

$$X = \lfloor (c^* + 2^d + q/2)/q \rfloor. \qquad (18)$$

This closely matches the definitions of compression given in Equation (7) and Equation (16).

After multiplying both sides of Equation (16) with q, the left side reads $X \cdot q$, which can be replaced with $$x - (x \bmod q),$$

since $$X \cdot q = x - (x \bmod q)$$

per Equation (17).

Hence, Equation (16) becomes $$(c^* \cdot 2^d + q/2 - ((c^* \cdot 2^d + q/2) \bmod q)) \bmod 2^d \stackrel{?}{=} c \cdot q \bmod 2^d. \qquad (19)$$

The left-hand side of Equation (19) is what is calculated in the compression unit 304. The comparison unit 205 then compares it with $c \cdot q \bmod 2^d$.

The term $$(c^* \cdot 2^d + q/2) \bmod q \qquad (20)$$

can be interpreted as a roundoff error, i.e., a difference $$x - \lfloor x/q \rfloor \cdot q.$$

By subtracting this compression error from the dividend x, one essentially computes $\lfloor x/q \rfloor \cdot q$ without the need for a division.

Further Optimizations and Simplifications

The first term $c^* \cdot 2^d \equiv 0 \bmod 2^d$ can thus be omitted. The ciphertext c is public, thus as many operations as possible may be performed on the right side of the equation. The addition of q/2 can be moved and the entire relation negated, which results in:

$$((c^{*2^d} + q/2) \bmod q) \bmod 2^d \stackrel{?}{=} (q/2 - c \cdot q) \bmod 2^d. \qquad (21)$$

Protected Computation of the Comparison

The comparison described in Equation (21) needs to be computed in a protected manner. The right-hand side of the equation does not contain any sensitive data (the ciphertext c is public) and can be computed without adding countermeasures. The left-hand side involves the secret c* and thus needs to be computed in a masked manner.

As noted above, the re-encryption returns c* masked arithmetically mod q:

$$c^* = c_1^* + c_2^* \bmod q \qquad (22)$$

The multiplication with $2^d$ and the addition of q/2 can be computed on each share independently:

$$c^* \cdot 2^d + q/2 = (c_1^* \cdot 2^d + q/2) + (c_2^* \cdot 2^d) \qquad (23)$$

The two arithmetic shares are then converted to Boolean shares using an arithmetic-to-Boolean (A2B) conversion $$(t', t'') = \text{A2B}(c_1^* \cdot 2^d + q/2, c_2^* \cdot 2^d). \qquad (24)$$

By definition of the A2B conversion, it holds that $$(c^* \cdot 2^d + q/2) \bmod q = t' \oplus t'. \qquad (25)$$

The reduction modulo $2^d$ can be done on the Boolean representation, leading to:

$$((c^* \cdot 2^d + q/2) \bmod q) \bmod 2^d = (t' \bmod 2^d) \oplus (t'' \bmod 2^d). \qquad (26)$$

Hence, Equation (21) becomes $$(t' \bmod 2^d) \oplus (t'' \bmod 2^d) \stackrel{?}{=} (q/2 - c \cdot q) \bmod 2^d. \qquad (27)$$

Since testing $a \stackrel{?}{=} b$ is equivalent to $a \oplus b \stackrel{?}{=} 0$, with the second option being easier to implement using masked arithmetic, the final comparison of the left-hand side with the right-hand side can be conducted using a masked XOR and a masked AND/OR gate:

$$((t' \oplus (q/2 - c \cdot q)) \oplus t'') \bmod 2^d \stackrel{?}{=} 0. \qquad (28)$$

Figure 4:
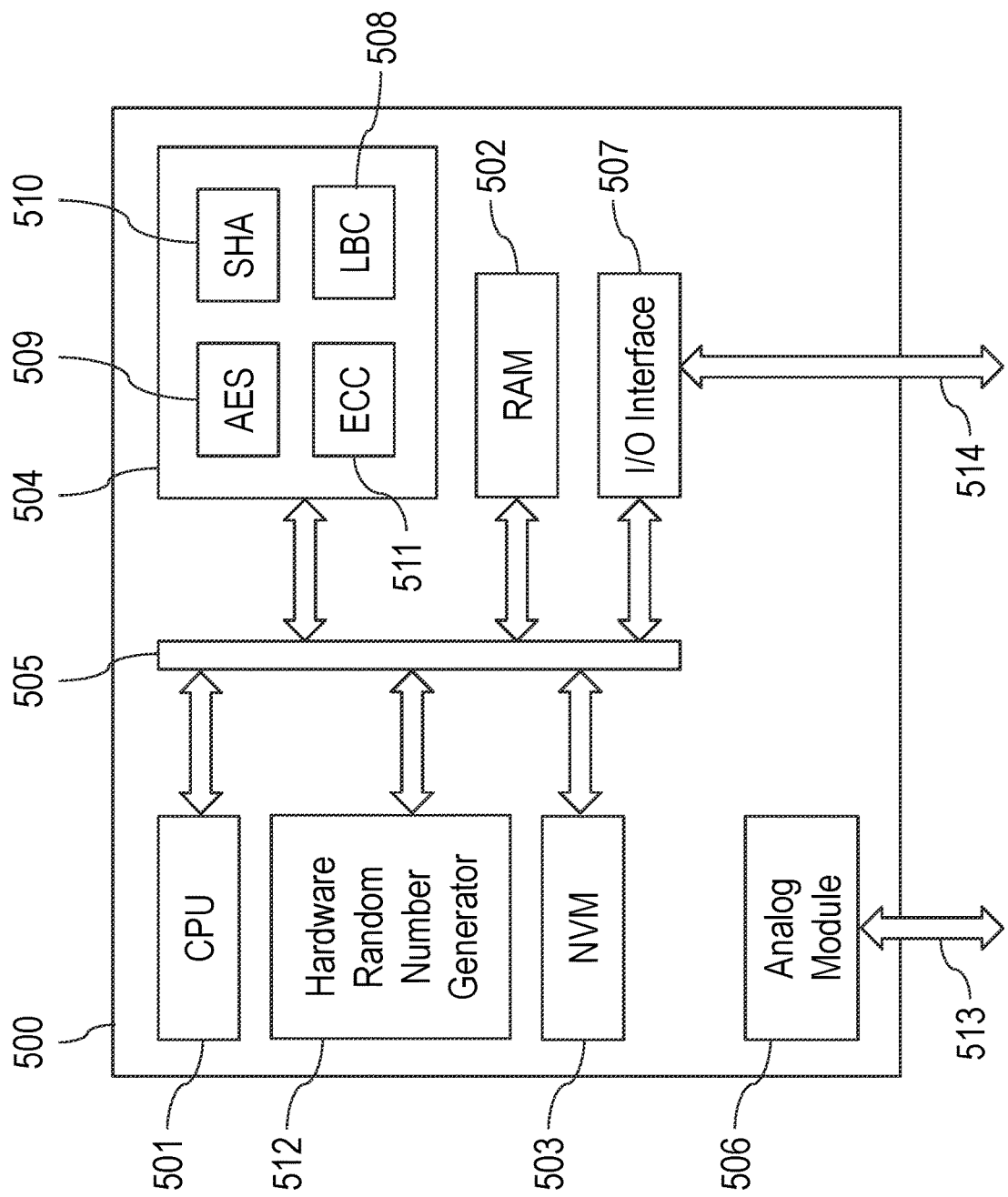
FIG. 4 shows an exemplary arrangement of a processing device comprising a CPU, a RAM, a non-volatile memory, a crypto module, an analog module, an input/output interface and a hardware-random number generator.

FIG. 4 shows a processing device 500 comprising a CPU 501, a RAM 502, a nonvolatile memory 503 (NVM), a crypto module 504, an analog module 506, an input/output interface 507 and a hardware-random number generator 112.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are:
- an AES core 509,
- a SHA core 510,
- an ECC core 511, and
- a lattice-based crypto core 508.

The CPU 501, the hardware random number generator 112, the NVM 503, the crypto module 504, the RAM 502 and the input/output interface 507 are connected to the bus 505. The input output interface 507 may have a connection to other devices, which may be similar to the processing device 500.

The crypto module 504 may or may not be equipped with hardware-based security features.

The bus 505 itself may be masked or plain. Instructions to process the steps described herein may in particular be stored in the NVM 503 and processed by the CPU 505. The data processed may be stored in the NVM 503 or in the RAM 502. Supporting functions may be provided by the crypto modules 504 (e.g., expansion of pseudo random data).

Steps of the method described herein may exclusively or at least partially be conducted on the crypto module 504, e.g. on the lattice-based crypto core 508.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

The solution described herein may be used by a customer that intends to provide a secure implementation of lattice-based cryptography on a smart card or any secure element.

Figure 5:
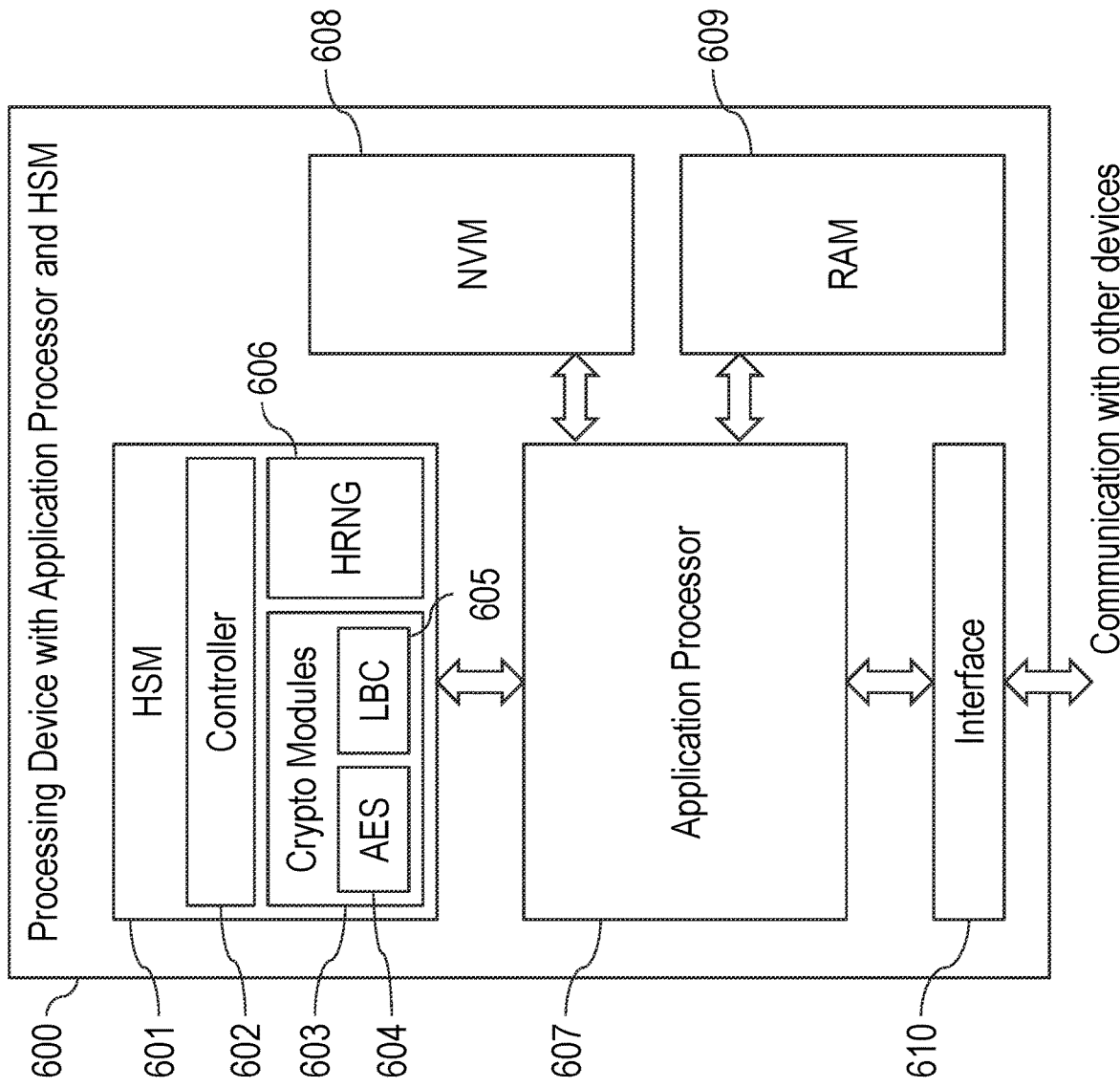
FIG. 5 shows an alternative arrangement with a hardware security module (HSM).

FIG. 5 shows another example of a processing device 600. The processing device 600 comprises a hardware security module 601, a non-volatile memory (NVM) 608, a random access memory (RAM) 609, an interface 610 for communication with other devices and an application processor 607, which is coupled with the hardware security module (HSM) 601, the RAM 609, the NVM 608 and the interface 610.

The HSM 601 comprises a controller 602, a hardware-random number generator (HRNG) 606 and at least one crypto module 603. The crypto module 603 exemplary comprises an AES core 604 and a lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control). The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor", as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of inter-operative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method of decapsulation performed by a receiver to protect the receiver against attack, the method comprising:
defining a compression function of a lattice-based cryptographic mechanism that is based on a lossy compression function, wherein the lossy compression function involves an integer division that introduces loss;
determining an error that is based on the loss and would be introduced by the integer division, without performing the integer division itself, thereby enabling an increase in computational speed in an implementation to be hardened against physical attacks;

determining an output of the compression function based on the error by computing a value based on the error by selecting bits of the error; and in response to the output of the compression function being equivalent to a received ciphertext or to an information that is based on the received ciphertext, outputting a knowledge value that is shared knowledge with a sender of the received ciphertext.

2. The method according to claim 1, wherein the compression function is determined based on a rounding down conversion, and the compression function is:

$$\text{Compress}_q(x, d) = \left\lceil \left(\frac{2^d}{q}\right) \cdot x \right\rfloor \mod 2^d$$
$$= \lfloor (x \cdot 2^d + q/2)/q \rfloor \mod 2^d,$$

with
- d being a compression parameter,
- q being a prime number,
- x being an information that is subject to the compression,
- $\lceil \cdot \rfloor$ being a rounding operation,
- $\lfloor \cdot \rfloor$ being a rounding down operation to a next smallest integer, and
- mod $2^d$ meaning reducing a result to a range $[0, 2^d-1]$.

3. The method according to claim 2, wherein a term $(x \cdot 2^d + q/2) \mod q$ is the error.

4. The method according to claim 1, further comprising: splitting an input of the compression function into at least two shares.

5. The method according to claim 1, wherein the compression function is determined after an arithmetic-to-Boolean masking conversion.

6. The method according to claim 1, wherein the compression function is at least partly conducted on a security device, a secured cloud, a secured service, an integrated circuit, a hardware security module, a trusted platform module, a crypto unit, a FPGA, a processor, a controller, or a smartcard.

7. A security device that is operable as a receiver protected against attack, comprising:
- a memory; and
- a compression processor that is coupled to the memory and arranged to compile a compression function by:
  - defining a compression function of a lattice-based cryptographic mechanism that is based on a lossy compression function, wherein the lossy compression function involves an integer division that introduces loss;
  - determining an error that is based on a loss and would be introduced by the integer division without performing the integer division itself, thereby enabling an increase in computational speed in an implementation to be hardened against physical attacks; and
  - determining an output of the compression function based on the error by computing a value based on the error by selecting bits of the error; and
  - if the output of the compression function is equivalent to a received ciphertext or to an information that is based on the received ciphertext, outputting a knowledge value that is shared knowledge with a sender of the received ciphertext.

8. The security device according to claim 7, wherein the security device comprises a secured cloud, a secured service, an integrated circuit, a hardware security module, a trusted platform module, a crypto unit, a FPGA, a processor, a controller, or a smartcard.

9. A non-transitory computer program product storing software code portions including instructions that, when executed by a digital processor, cause a security device to perform the steps of the method according to claim 1.

* * * * *